United States Patent [19]

Yamamoto et al.

[11] 4,410,338

[45] Oct. 18, 1983

[54] GAS SEPARATING MEMBERS AND A METHOD OF MAKING THE SAME

[75] Inventors: Minoru Yamamoto; Masana Hirai; Jiro Sakata, all of Nagoya, Japan

[73] Assignee: Kabushiki Kaisha Toyota Chuo Kenkyusho, Aichi, Japan

[21] Appl. No.: 388,577

[22] Filed: Jun. 15, 1982

Related U.S. Application Data

[63] Continuation of Ser. No. 159,275, Jun. 13, 1980, abandoned.

[30] Foreign Application Priority Data

Jun. 25, 1979 [JP] Japan .................. 54-79952
Oct. 17, 1979 [JP] Japan .................. 54-134466

[51] Int. Cl.³ .......................................... B01D 53/22
[52] U.S. Cl. ........................................ 55/158; 55/16; 427/40; 427/41; 427/245; 427/412.1
[58] Field of Search .............. 55/16, 158; 210/490, 210/500.2; 427/38–41, 244, 245, 412.5

[56] References Cited

U.S. PATENT DOCUMENTS

| | | | |
|---|---|---|---|
| 2,966,235 | 12/1960 | Kammermeyer | 55/16 |
| 2,980,532 | 4/1961 | Martensson et al. | 55/16 X |
| 3,657,113 | 4/1972 | Stancell et al. | 210/490 X |
| 3,717,525 | 2/1973 | Bultemann | 55/158 X |
| 3,775,308 | 11/1973 | Yasuda | 210/500.2 X |
| 3,846,521 | 11/1974 | Osterholtz | 55/16 X |
| 3,847,652 | 11/1974 | Fletcher et al. | 427/41 |
| 3,894,166 | 7/1975 | Brown et al. | 210/500.2 X |
| 3,980,456 | 9/1976 | Browall | 55/158 |
| 4,029,842 | 6/1977 | Yoshida et al. | 427/412.5 X |
| 4,032,440 | 6/1977 | Yasuda | 210/500.2 X |
| 4,096,315 | 6/1978 | Kubacki | 427/41 X |
| 4,137,365 | 1/1979 | Wydeven et al. | 427/41 X |
| 4,199,448 | 4/1980 | Johnson et al. | 427/41 X |
| 4,230,463 | 10/1980 | Henis et al. | 55/16 |
| 4,260,647 | 4/1981 | Wang et al. | 427/41 X |

*Primary Examiner*—Robert H. Spitzer
*Attorney, Agent, or Firm*—Blum, Kaplan, Friedman, Silberman & Beran

[57] ABSTRACT

A gas separating member of the present invention comprises a porous substrate in the form of a film, wall or hollow fiber and a polymer film formed on a surface of the substrate by plasma polymerization. The gas separation factor ($O_2/N_2$) ranges from 2.3 to 3.9 with the corresponding gas permeability ranging from 12 to 0.16 liter/min. m² atm. pres.-air.

A modified gas separating member of the present invention, which comprises a porous substrate in the aforementioned form and two polymer films formed on a surface of the substrate by plasma polymerization, has the gas separation factor ($He/H_2$) ranging from 14 to 45.

19 Claims, 7 Drawing Figures

GAS SEPARATING MEMBERS AND A METHOD OF MAKING THE SAME

This is a continuation, of application Ser. No. 159,275, filed June 13, 1980, now abandoned.

BACKGROUND OF THE INVENTION

1. Field of the Invention

This invention relates to gas separating members which separate gases selectively, and a method of making them.

2. Description of the Prior Art

The use of a gas separating member in the form of a film or wall has been examined in such fields of application as separating oxygen from nitrogen in air to obtain air having a high concentration of oxygen, or discharging an excess of carbon dioxide into the water from the interior of an underwater laboratory and taking the necessary oxygen from the water. However, such known gas separating members have been of practical use only in a very limited area of applications, because they have too small a gas separation factor, or too low a gas permeability.

SUMMARY OF THE INVENTION

The present invention has been made in order to overcome the foregoing problems and has an object to provide a novel gas separating member which comprises a porous substrate in the form of a film, wall or bottom fiber, and a polymer film formed on a surface of the substrate by plasma polymerization.

A primary object of the present invention is to provide a gas separating member which is very superior in a gas separation factor and a gas permeability to any known gas separating member.

Another object of the present invention is to provide a gas separating member which has a high mechanical strength.

Still another object of the present invention is to provide a gas separating member which separates oxygen from nitrogen in air.

Yet another object of the present invention is to provide a gas separating member which separates helium or hydrogen from other gases.

A still further object is to provide a method of making the aforesaid gas separating member.

BRIEF DESCRIPTION OF THE DRAWINGS

Various other objects, features and advantages of the present invention will be apparent from the following detailed description when considered in connection with the accompanying drawings, in which like reference characters or numerals designate like parts in the various views, and wherein.

DESCRIPTION OF THE PREFERRED EMBODIMENTS

The gas separating member of this invention is characterized by comprising a porous substrate in the form of a film, wall or hollow fiber, and a polymer film formed on a surface of the substrate by plasma polymerization.

The porous substrate herein serves to provide mechanical strength to a gas separating member, and means a porous film, wall or hollow fiber having pores of a diameter of several tens of angstroms (A) to several micrometers. More specifically, the substrate may be a sintered product obtained by sintering metal, ceramic or polymer particles, a fibrous product formed by knitting or weaving fibers, or stacking fibers in felt form, or a porous polymer film, or a porous hollow fiber which has a diameter of several thousands of angstroms to several millimeters.

The substrate may have the form of a flat plate or a tube, or any other form. The substrate in the form of a fine tube or hollow fiber has the following merits compared with that in the form of a flat plate or film. The substrate in the form of a hollow fiber can be used under higher pressure because of its superiority in pressure resistance.

Moreover, the substrate in the form of a hollow fiber has an advantage over that in the form of a film in that larger area for permeation can be obtained in a certain cubic volume. Therefore a gas separating device, if the gas separating member in the form of a hollow fiber is employed, becomes more compact.

The substrates in the form of a hollow fiber which can be used for the gas separating member in accordance with this invention include a porous polypropylene hollow fiber having a multiplicity of pores of a diameter of about several hundreds of angstroms, a porous glass hollow fiber and a porous cellulose acetate hollow fiber.

The method of this invention, which forms a polymer film by plasma polymerization, permits relatively easy formation of a polymer film on a relatively complicated surface configuration, such as a tubular surface, or uneven surface.

In order to form a stable polymer film over the surfaces of the pores present in the surface of the substrate, a diameter of the pores is preferably not more than several thousands of angstroms if they are circular. If the pores are rectangular or oval, or the like, their minor side or axis is preferably not more than 1,000 angstroms in length. The substrates which can be used advantageously include a porous cellulose acetate or porous polycarbonate film having a multiplicity of pores having a diameter of several tens to several hundreds of angstroms uniformly formed therein, and a porous polypropylene film in which rectangular pores having their minor side or axis of several hundreds of angstroms are formed by stretching.

The plasma polymerization by which a polymer film is formed on the substrate surface means a method for polymerization which comprises introducing organic monomers into a space filled with a plasma, whereby the organic monomers are activated and converted into radicals or ions to effect polymerization. More specifically, an electric field is applied to a low pressure gas to energize it into a gas of high energy, whereby the gas of high energy is converted into a dissociated form enriched with electrons, ions and radicals, i.e., a plasma. The space occupied by the plasma is fed with organic monomers. The organic monomers are activated like radicals or ions, and the unreacted monomers are polymerized progressively, thereby forming a polymer film on a surface of the substrate placed in the space. The internal and external electrode methods are available for the application of an electric field. According to the internal electrode method, it is possible to apply a direct or alternating current, or high frequency electric field, while the external electrode method permits application of a high frequency electric field. The plasma polymerization for this invention can also be accomplished by a method generally known as reverse sputtering which is the same as the aforementioned internal electrode method.

The organic monomers which can be used for the formation of a polymer film according to this invention include organosilanes such as hexamethyldisiloxane, diethoxydimethylsilane, octamethylcyclotetrasiloxane, tetraethoxysilane, triethoxyvinylsilane and tetramethylsilane, olefins such as 1-hexene and cyclohexene, and other organic substances hitherto reported as being capable of forming a film by plasma polymerization.

In the gas separating member of this invention, the surfaces of the pores present in the surface of the substrate are covered with a polymer film formed by plasma polymerization. It is by the polymer film formed over the surfaces of the pores that gas separation can be effected. Therefore, it is important to know the nature of the polymer film formed over the surfaces of the pores, but impossible to do so by any presently available means for determining physical properties, since the pore diameter is as fine as 1,000 angstroms or less. It is, however, presumed from up-to-date knowledge on plasma polymerization that polymers begin to form around the pores of the substrate and grow toward the centers thereof until they close the central openings thereof to form a continuous film. It is, therefore, supposed that the polymer film formed over the surfaces of the pores have a greater thickness around the pores than in the center thereof, instead of having a uniform thickness over the whole surfaces of the pores. As it is considered that various modes of reactions take place simultaneously in a plasma, it is assumed that the polymer film thereby obtained would have a different chemical composition from that of a polymer film formed by an ordinary method for polymerization. Differences in chemical composition therebetween can be inferred, for example, from the fact that while a known silicone film composed of a dimethylpolysiloxane structure has a low mechanical strength and a gas separation factor ($O_2/N_2$) of only about 2.0, the gas separating member having a silicone film obtained by plasma polymerization in accordance with this invention has a high mechanical strength and a gas separation factor ($O_2/N_2$) which is as high as at least 2.3.

The performance of the gas separating member according to this invention is such that its gas separation factor ($O_2/N_2$) ranges from 2.3 to 3.9 with the corresponding gas permeability ranging from 12 to 0.16 liter/min.·$m^2$· atm. pres.-air. It is noted that this performance is very superior as compared with the gas separation factor of 1.9 and the gas permeability of 0.17 liter/min.·$m^2$·atm. pres.-air of a typically known gas separating member, i.e., a silicone film composed principally of a dimethylpolysiloxane structure and having a thickness of 100 micrometers. The aforementioned values showing the performance of the gas separating member according to this invention indicate the performance of the gas separating member including the substrate. However, gas separation is accomplished only by the polymer film formed over the surfaces of the pores in the surface of the substrate. Accordingly, if only the surface area of the pores (effective area for gas permeation) is taken into consideration, the gas separating member of this invention ought to show a still higher value of gas permeability. Calculations indicate that the gas permeability amounts to a surprisingly high value of 650 liters/min.·$m^2$·atm. pres.-air when the separation factor ($O_2/N_2$) is about 2.7. A still better gas separating member can, therefore, be obtained if there is developed a porous substrate having a multiplicity of finer pores and having a greater total area of the surfaces of the pores.

Furthermore, in the present invention, two polymer films can be formed on the substrate by plasma polymerization. A gas separating member, which comprises a porous substrate in the form of a film, wall or hollow fiber, the first polymer film of organosilane formed on a surface of the substrate by plasma polymerization and the second polymer film of hydrocarbon formed on the surface of the first polymer film by plasma polymerization, has special features. The gas separating member has the following gas permeability for each gas. The permeabilities of hydrogen, helium, nitrogen and oxygen are, respectively, $1.2 \times 10^{-4}$, $1.0 \times 10^{-4}$, $3.9 \times 10^{-6}$ and $1.6 \times 10^{-5}$ $cm^3/sec.\cdot cm^2 \cdot cmHg$.

The gas separating member can be used for the enrichment of hydrogen and helium. In order to understand more easily the features of the gas separating member, two examples are shown. Suppose that the gas separating member is placed between a mixed gas chamber at one atmospheric pressure and a vacuum chamber. The surface area of the gas separating member is 1 $m^2$ and the time for separation is one minute. When the mixed gas consists of 50 volume % of hydrogen and 50 volume % of air, the total volume of gases, which are permeated through the gas separating members, is 2.8 liters. The permeated gases consist of about 95 volume % of hydrogen, 2.5 volume % of nitrogen and 2.8 volume % of oxygen. In the case that the mixed gas consists of 50 volume % of helium and 50 volume % of air, the total volume of gases permeated are 2.5 liters and the gases consist of about 94 volume % of helium, 2.9 volume % of nitrogen and 3.3 volume % of oxygen.

With regard to the gas separating member, the first polymer film is preferably composed of organosilane and the second polymer film is preferably composed of hydrocarbon. The first polymer film is considered to be contributed to the high permeability of gases and the second polymer film is contributed to the high separation factors of $H_2$/air and He/air.

The polymer film which effects gas separation is rigidly united with the substrate surface by plasma polymerization, so that the gas separating member of this invention has not only a high rate of performance in gas separation, but also has as high a mechanical strength as the substrate does. Thus, the gas separating member of this invention is, from an overall standpoint, of high practical value.

According to this invention, it is possible to form a strong poymer film easily on the substrate surface, irrespective of the shape of the substrate, since it is by plasma polymerization that the polymer film is formed on the substrate surface. Therefore, gas separating members composed of hollow fibers can also be made easily by the method of this invention.

The gas permeability and separation factor were determined by separating, detecting and measuring constituents of permeated gas in a gas chromatograph in accordance with the ASTM method (pressure method).

More specifically, a gas separating member is the form of a film was placed in a permeation cell, and after the spaces on both sides of the film were evacuated by a vacuum pump, compressed air at 1.1 kg/cm$^2$ was introduced into the space on one side of the film. The gas which had permeated through the gas separating member in the form of the film within a predetermined length of time was temporarily trapped, and then introduced into a gas chromatograph. The gas was separated into its constituents, i.e., oxygen and nitrogen in a molecular sieve type column, and the amount of each constituent was obtained from a working curve which had previously been prepared, whereby the separation factor ($O_2/N_2$), rate of oxygen permeation, rate of nitrogen premeation and amount of permeated gases ($O_2+N_2$) were calculated.

The gas separating member of this invention is considered to have a thickness which is not more than several thousands of angstroms. Polymer films were formed on glass plates, instead of the substrate, in accordance with the same conditions of plasma polymerization as those which were employed in the method of this invention, and the thickness of each of such polymer films was determined by inspecting an interference fringe through an interference microscope. The thickness of any film formed by plasma polymerization in the Examples which will hereinafter be described was within the range of from 1,000 to 3,000 angstroms.

Although the foregoing description of the gas separating member according to this invention has been directed solely to the separation of air into oxygen and nitrogen, the gas separating member of this invention can also advantageously be used for the separation of hydrogen, helium, carbon monoxide, carbon dioxide, readioactive rare gas, etc.

The invention will now be described with reference to Examples.

Figure 1:
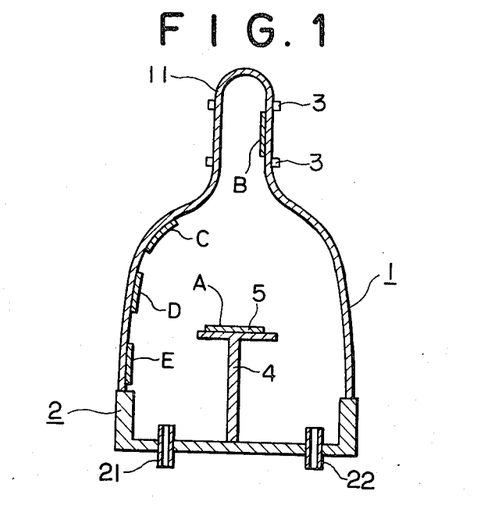
FIG. 1 is a sectional view of the apparatus used for plasma polymerization in the Examples of this invention.

FIG. 1 shows a sectional view in outline of a plasma generator used in the present Examples. The plasma generator comprises a glass jar 1 of about 50 cm in height and about 30 cm in diameter of the bottom part thereof which has a top projection 11 having a diameter of about 7 cm; a metal base 2 forming the bottom of the jar 1; and a pair of electrodes 3 made of a copper strip which is wound around the top and bottom of the projection 11, respectively. The base 2 is provided with a passage 21 through which a monomer gas is introduced into the jar 1 and a passage 22 through which the interior of the jar 1 is evacuated. A sample table 4 made of a metal is provided in the jar 1.

A substrate 5 in the form of a film on which a polymer film was to be formed by plasma polymerization was placed on the sample table 4 in the jar 1 ('A' position), between the electrodes 3 on the top projection 11 ('B' position), on the shoulder of the jar 1 ('C' position), on the mid-portion of the jar 1 ('D' position), or on the lower portion of the jar 1 ('E' position). A pair of substrates 5 having the size of 7 cm by 10 cm each were placed side by side in the same position.

Figure 2:
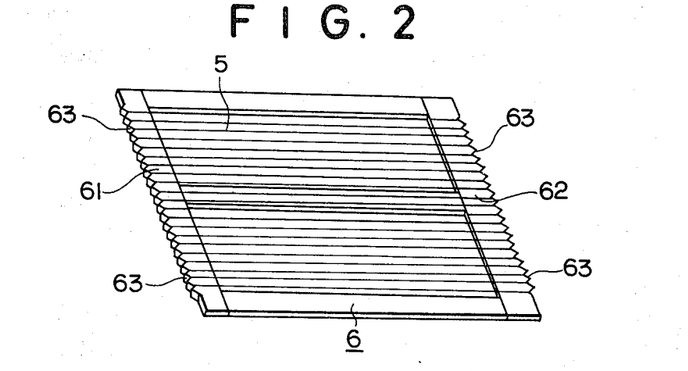
FIG. 2 is a perspective view of a supporting frame on which a substrate in the form of a hollow fiber is wound.

A substrate in the form of a hollow fiber 5 is wound on a supporting frame 6 made of polycarbonate, as shown in FIG. 2, and the substrate with the supporting frame 6 is placed on the sample table 4. The supporting frame 6 has ditches 63 spaced in a certain distance therebetween on both of the oppositely facing sides 61, 62 of the supporting frame. The substrate in the form of a hollow fiber is embedded in each of the ditches 63 and wound in a certain space on the supporting frame 6. This use of the supporting frame 6 prevents the surface of the substrate in the form of the hollow fiber from contacting each other. If the surface of the substrate in the form of the hollow fiber comes in contact with each other, a polymer film will not be formed on the contacted surface of the substrate. At the present stage, the supporting frame 6 is used for the experimental production of the gas separating member. For the mass production, a lot of bobins arranged in a line at a certain space therebetween will be used instead of the supporting frame 6. A polymer film may be formed on the surface of the substrate while the substrate in the form of a hollow fiber is continuously wound by the bobins.

Plasma polymerization was performed by firstly placing the substrates in at least one of the aforementioned 'A' to 'E' positions, and evacuating the jar 1 through the passage 22 by a vacuum pump (not shown). While the vacuum pump was kept operating to continue evacuation, a predetermined kind of organic monomers were introduced into the jar 1 through the passage 21, and the atmospheric pressure in the jar was maintained at about 0.1 to 0.3 Torr. A predetermined power input of high frequency voltage was applied across the electrodes 3 so as to cause plasma polymerization to take place, whereby a polymer film was formed on the surface of the substrate 5 after a predetermined length of time. The plasma polymerization in all of the following Examples were performed by the foregoing method. Therefore, the description of each Example will be limited to the kinds of the organic monomers and the substrates used, and the conditions of plasma polymerization involved.

The following table shows the substrates in the form of a film used in the examples 1 to 19 and 23 to 36.

| Substrate | Material | Pore Size (Å) | Total Pore Area (%) Approx. | Thickness (Micrometers) | Others |
|---|---|---|---|---|---|
| PP | Polypropylene | 200 × 2,000 | 3 | 25 | Rectangular pores |
| PC-1 | Polycarbonate | 1,000 dia. | 2.4 | 5 | Circular pores |
| PC-2 | Polycarbonate | 500 dia. | 1.2 | 5 | Circular pores |
| PC-2 | Polycarbonate | 300 dia. | 0.4 | 5 | Circular pores |
| PC-4 | Polycarbonate | 150 dia. | 0.1 | 5 | Circular pores |
| AC-1 | Cellulose acetate | 500 dia. | 3 | 150 | Circular pores |
| AC-2 | Cellulose acetate | 250 dia. | 2 | 150 | Circular pores |

EXAMPLE 1

A PP substrate was placed in the sample position 'A' (FIG. 1), and hexamethyldisiloxane was used as organic monomers. They were reacted for 30 minutes at a monomer pressure of 0.2 Torr and a power input of 50 watts across the electrodes, so that a polymer film was formed on the substrate to prepare a gas separating member according to this invention.

Figure 3:
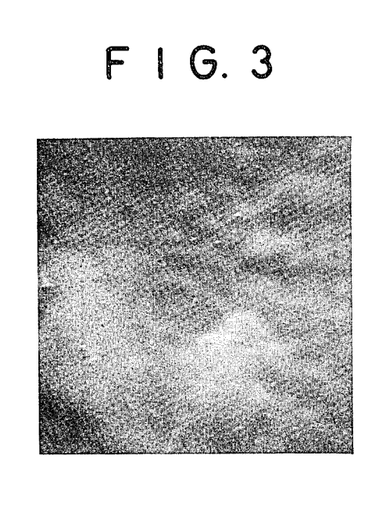
FIGS. 3 and 4 are photographs by a scanning electron microscope of the front and rear sides, respectively, of the gas separating member of this invention made in Example 1.
Figure 4:
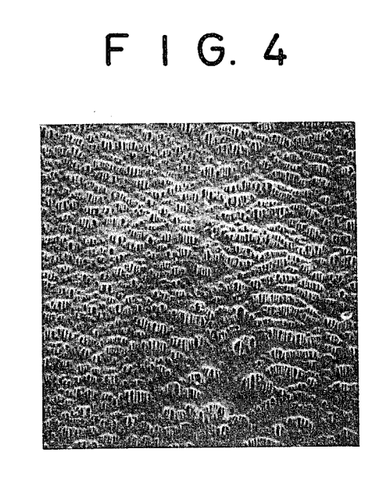
Figure 5:
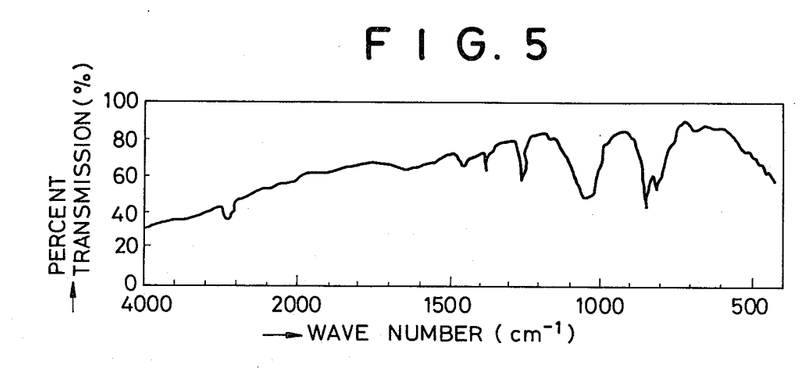
FIGS. 5 and 6 show infrared absorption spectra for the polymer films on the gas separating members of this invention prepared in Examples 1 and 10 respectively.

FIG. 3 is a photograph (10,000 magnifications) by a scanning electron microscope of the surface of the polymer film formed on the substrate which constitutes the thus-obtained gas separating member. FIG. 4 is a photograph (10,000 magnifications) by a scanning electron microscope of the surface of the substrate side of the gas separating member. These photographs show that the rectangular pores in the substrate are completely covered with the polymer film. For further reference, FIG. 5 shows an infrared absorption spectrum for the polymer film obtained in the present Example. The results of Electron Spectroscopy for Chemical Analysis (ESCA) indicated that the polymer film was composed of 70 atomic % of carbon, 12 atomic % of oxygen and 18 atomic % of silicon.

The gas permeability and separation factor of the gas separating member were measured by the ASTM method. The results were as follows:
Separation factor ($O_2/N_2$): 2.5
Rate of oxygen permeation: $2.0 \times 10^{-4}$ cm$^3$/sec.·cm$^2$·cmHg
Rate of nitrogen permeation: $8.0 \times 10^{-5}$ cm$^3$/sec.·cm$^2$·cmHg
Amount of oxygen and nitrogen permeated: 4.7 liters/min.·m$^2$·atm. pres.-air

EXAMPLE 2

The same substrate and organic monomers as used in Example 1 were used, and reacted in the sample position 'B' for 30 minutes at a monomer pressure of 0.3 Torr and a power input of 80 watts across the electrodes, whereby a polymer film was formed on the substrate to prepare a gas separating member.

The separation factor and gas permeability of this gas separating member were as follows:
Separation factor ($O_2/N_2$): 3.2
Rate of oxygen permeation: $2.2 \times 10^{-5}$ cm$^3$/sec.·cm$^2$·cmHg
Rate of nitrogen permeation: $6.8 \times 10^{-6}$ cm$^3$/sec.·cm$^2$·cmHg
Amount of oxygen and nitrogen permeated: 0.45 liter/min.·m$^2$·atm. pres.-air

EXAMPLE 3

A PC-2 substrate was placed in the sample position 'C', and hexamethyldisiloxane was used as organic monomers. They were reacted for 30 minutes at a monomer pressure of 0.2 Torr and a power input of 50 watts across the electrodes, whereby a polymer film was formed on the substrate to prepare a gas separating member according to this invention.

The results of ESCA (Electron Spectroscopy for Chemical Analysis) for this polymer film indicated that it was composed of 68 atomic % of carbon, 13 atomic % of oxygen and 19 atomic % of silicon. The gase separating performance of this gas separating member was as follows:
Separation factor ($O_2/N_2$): 2.3
Rate of oxygen permeation: $3.1 \times 10^{-5}$ cm$^3$/sec.·cm$^2$·cmHg
Rate of nitrogen permeation: $1.3 \times 10^{-5}$ cm$^3$/sec.·cm$^2$·cmHg
Amount of oxygen and nitrogen permeated: 0.77 liter/min.·m$^2$·atm. pres.-air

EXAMPLE 4

A PC-3 substrate was placed in the sample position 'A', and hexamethyldisiloxane was used as organic monomers. They were reacted for 60 minutes at a monomer pressure of 0.2 Torr and a power input of 50 watts across the electrodes, whereby a polymer film was formed on the substrate to prepare a gas separating member according to this invention.

The gas separating performance of this gas separating member was as follows:
Separation factor ($O_2/N_2$): 3.6
Rate of oxygen permeation: $9.5 \times 10^{-6}$ cm$^3$/sec.·cm$^2$·cmHg
Rate of nitrogen permeation: $2.6 \times 10^{-6}$ cm$^3$/sec.·cm$^2$·cmHg
Amount of oxygen and nitrogen permeated: 0.19 liter/min.·m$^2$·atm. pres.-air

EXAMPLE 5

The procedures of Example 4 were repeated, excepted that a PC-4 substrate was used, whereby a polymer film was formed on the substrate to prepare a gas separating member according to this invention. The gas separating performance of this gas separating member was as follows:
Separation factor ($O_2/N_2$): 3.5
Rate of oxygen permeation: $1.2 \times 10^{-5}$ cm$^3$/sec.·cm$^2$·cmHg
Rate of nitrogen permeation: $3.3 \times 10^{-6}$ cm$^3$/sec.·cm$^2$·cmHg
Amount of oxygen and nitrogen permeated: 0.23 liter/min.·m$^2$·atm. pres.-air

EXAMPLE 6

The procedures of Example 4 were repeated, except that a PC-2 substrate was used, whereby polymer film was formed on the substrate to prepare a gas separating member according to this invention. The gas separating performance of this gas separating member was as follows:
Separation factor ($O_2/N_2$): 2.7
Rate of oxygen permeation: $2.4 \times 10^{-5}$ cm$^3$/sec.cm$^2$·cmHg
Rate of nitrogen permeation: $9.0 \times 10^{-6}$ cm$^3$/sec.cm$^2$·cmHg
Amount of oxygen and nitrogen permeated: 0.55 liter/min.m$^2$·atm. pres.-air

EXAMPLE 7

The procedures of Example 1 were repeated, except that diethoxydimethylsilane as organic monomers was used, whereby a polymer film was formed on the substrate to prepare a gas separating member according to this invention. The resuls of ESCA for this polymer film indicated that it was composed of 60 atomic % of carbon, 22 atomic % of oxygen and 17 atomic % of silicon. The gas separating performance of this gas separating member was as follows:
Separation factor ($O_2/N_2$): 2.7
Rate of oxygen permeation: $9.5 \times 10^{-5}$ cm$^3$/sec.cm$^2$·cmHg Rate of nitrogen permeation: $3.5 \times 10^{-5}$ cm$^3$/sec.cm$^2$·cmHg Amount of oxygen and nitrogen permeated: 2.2 liters/min.m$^2$·atm. pres.-air

EXAMPLE 8

The procedures of Example 7 were repeated, except that the substrate was placed in the sample position 'B', and that the reaction was continued for 20 minutes, whereby a polymer film was formed on the substrate to prepare a gas separating member according to this invention. The performance of this gas separating member was as follows:

Separation factor (O$_2$/N$_2$): 3.5

Rate of oxygen permeation: $7.7 \times 10^{-6}$ cm$^3$/sec.cm$^2$·cmHg

Rate of nitrogen permeation: $2.2 \times 10^{-6}$ cm$^3$/sec.cm$^2$·cmHg

Amount of oxygen and nitrogen permeated: 0.15 liter/min.m$^2$·atm. pres.-air

EXAMPLE 9

The procedures of Example 1 were repeated, except that tetraethoxysilane was used as organic monomers, whereby a polymer film was formed on the substrate to prepare a gas separating member according to this invention. The results of ESCA for this polymer film indicated that it was composed to 70 atomic % of carbon, 22 atomic % of oxygen and 8 atomic % of silicon. The performance of this gas separating member was as follows:

Separation factor (O$_2$/N$_2$): 2.0

Rate of oxygen permeation: $5.3 \times 10^{-5}$ cm$^3$/sec.cm$^2$·cmHg

Rate of nitrogen permeation: $2.7 \times 10^{-5}$ cm$^3$/sec.cm$^2$·cmHg

Amount of oxygen and nitrogen permeated: 1.5 liters/min.m$^2$·atm. pres.-air

EXAMPLE 10

Figure 6:
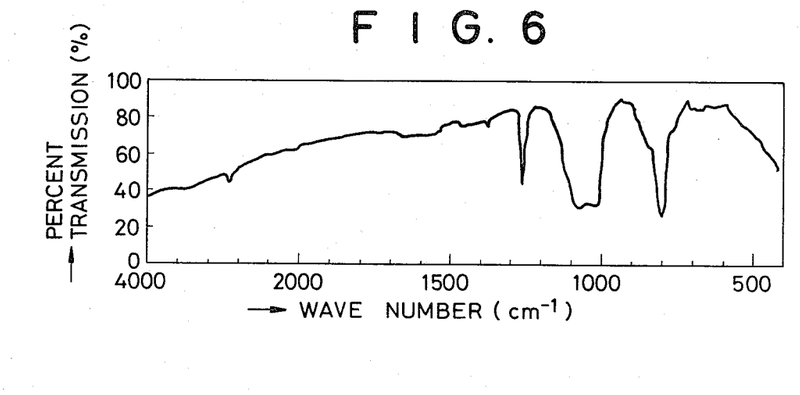

The procedures of Example 1 were repeated, except that octamethylcyclotetrasiloxane was used as organic monomers, whereby a polymer film was formed on the substrate to prepare a gas separating member according to this invention. For the purpose of reference, FIG. 6 shows an infrared absorption spectrum for the polymer film formed in the present Example. The results of ESCA of the polymer film indicated that it is composed of 81 atomic % of carbon, 11 atomic % of oxygen and 8 atomic % of silicon. The performance of this gas separating member was as follows:

Separation factor (O$_2$/N$_2$): 2.7

Rate of oxygen permeation: $1.3 \times 10^{-4}$ cm$^3$/sec.cm$^2$·cmHg

Rate of nitrogen permeation: $4.9 \times 10^{-5}$ cm$^3$/sec.cm$^2$·cmHg

Amount of oxygen and nitrogen permeated: 3.0 liters/min.m$^2$·atm. pres.-air

EXAMPLE 11

The procedures of Example 10 were repeated, except that the substrate was placed in the sample position 'E', whereby a polymer film was formed on the substrate to prepare a gas separating member according to this invention. The performance of this gas separating member was was follows:

Separation factor (O$_2$/N$_2$): 2.3

Rate of oxygen permeation: $4.8 \times 10^{-4}$ cm$^3$/sec.cm$^2$·cmHg

Rate of nitrogen permeation: $2.1 \times 10^{-4}$ cm$^3$/sec.cm$^2$·cmHg

Amount of oxygen and nitrogen permeated: 12 liters/min.m$^2$·atm. pres.-air

EXAMPLE 12

The procedures of Example 1 were repeated, except that a PC-2 substrate, and octamethylcyclotetrasiloxane as organic monomers were used, whereby a polymer film was formed on the substrate to prepare a gas separating member according to this invention. The performance of this gas separating member was as follows:

Separation factor (O$_2$/N$_2$): 2.7

Rate of oxygen permeation: $3.6 \times 10^{-5}$ cm$^3$/sec.cm$^2$·cmHg

Rate of nitrogen permeation: $1.3 \times 10^{-5}$ cm$^3$/sec.cm$^2$·cmHg

Amount of oxygen and nitrogen permeated: 0.82 liter/min.m$^2$·atm. pres.-air

EXAMPLE 13

The procedure of Example 12 were repeated, except that a PC-1 substrate was placed in the sample position 'C', whereby a polymer film was formed on the substrate to prepare a gas separating member according to this invention. The performance of this gas separating member was as follows:

Separation factor (O$_2$/N$_2$): 2.0

Rate of oxygen permeation: $1.6 \times 10^{-4}$ cm$^3$/sec.cm$^2$·cmHg

Rate of nitrogen permeation: $7.8 \times 10^{-5}$ cm$^3$/sec.cm$^2$·cmHg

Amount of oxygen and nitrogen permeated: 4.3 liters/min.m$^2$·atm. pres.-air

EXAMPLE 14

The procedures of Example 12 were repeated, except that a PC-3 substrate was placed in the sample position 'C' and that the reaction was continued for 20 minutes, whereby a polymer film was formed on the substrate to prepare a gas separating member according to this invention. The performance of this gas separating member was as follows:

Separation factor (O$_2$/N$_2$): 3.5

Rate of oxygen permeation: $2.0 \times 10^{-5}$ cm$^3$/sec.cm$^2$·cmHg

Rate of nitrogen permeation: $5.7 \times 10^{-6}$ cm$^3$/sec.cm$^2$·cmHg

Amount of oxygen and nitrogen permeated: 0.39 liter/min.m$^2$·atm. pres.-air

EXAMPLE 15

The procedures of Example 12 were repeated, except that a PC-4 substrate was placed in the sample position 'C' and that the reaction was continued for 20 minutes, whereby a polymer film was formed on the substrate to prepare a gas separating member according to this invention. Its performance was as follows:

Separation factor (O$_2$/N$_2$): 3.1

Rate of oxygen permeation: $2.2 \times 10^{-5}$ cm$^3$/sec.cm$^2$·cmHg

Rate of nitrogen permeation: $7.2 \times 10^{-6}$ cm$^3$/sec.cm$^2$·cmHg

Amount of oxygen and nitrogen permeated: 0.47 liter/min.m$^2$·atm. pres.-air

EXAMPLE 16

The procedures of Example 12 were repeated, except that an AC-1 substrate was used and that the reaction was continued for 50 minutes, whereby a polymer film was formed on the substrate to prepare a gas separating member according to this invention. Its performance was as follows:

Separation factor ($O_2/N_2$): 2.0
Rate of oxygen permeation: $1.1 \times 10^{-4}$ cm$^3$/sec.c-m$^2$·cmHg
Rate of nitrogen permeation: $5.4 \times 10^{-5}$ cm/sec.c-m$^3$·cmHg
Amount of oxygen and nitrogen permeated: 3.0 liters/min.m$^2$·atm. pres.-air

EXAMPLE 17

The procedures of Example 16 were repeated, except that an AC-2 substrate was used, whereby a polymer film was formed on the substrate to prepare a gas separating member according to this invention. Its performance was as follows:

Separation factor ($O_2/N_2$): 2.3
Rate of oxygen permeation: $1.5 \times 10^{-4}$ cm$^3$/sec.c-m$^2$·cmHg
Rate of nitrogen permeation: $6.8 \times 10^{-5}$ cm$^3$/sec.c-m$^2$·cmHg
Amount of oxygen and nitrogen permeated: 3.9 liters/min.m$^2$·atm. pres.-air

EXAMPLE 18

The procedures of Example 1 were repeated, except that the substrate was placed in the sample position 'D' and that triethoxyvinylsilane was used as organic monomers, whereby a polymer film was formed on the substrate to prepare a gas separating member according to this invention. Its performance was as follows:

Separation factor ($O_2/N_2$): 2.6
Rate of oxygen permeation: $7.0 \times 10^{-5}$ cm$^3$/sec.c-m$^2$·cmHg
Rate of nitrogen permeation: $2.8 \times 10^{-5}$ cm$^3$/sec.c-m$^2$·cmHg
Amount of oxygen and nitrogen permeated: 1.7 liters/min.m$^2$·atm. pres.-air

EXAMPLE 19

The procedures of Example 1 were repeated, except that 1-hexene was used as organic monomers and that the reaction was continued for 60 minutes in the sample position 'C', whereby a polymer film was formed on the substrate to prepare a gas separating member according to this invention. Its performance was as follows:

Separation factor ($O_2/N_2$): 3.9
Rate of oxygen permeation: $8.7 \times 10^{-6}$ cm$^3$/sec.c-m$^2$·cmHg
Rate of nitrogen permeation: $2.2 \times 10^{-6}$ cm$^3$/sec.c-m$^2$·cmHg
Amount of oxygen and nitrogen permeated: 0.16 liter/min.m$^2$·atm. pres.-air

EXAMPLE 20

As a substrate was used a porous polypropylene hollow fiber having the outer diameter of 250 micrometers, and the inner diameter of 200 micro-meters with the pores of 200 angstroms in their miner axis and 3000 angstroms in their longer axis in the wall surface of the substrate. The substrate was wound on the supporting frame 6 as shown in FIG. 2 and placed in the sample position 'A' (FIG. 1). Hexamethyldisiloxane was used as organic monomers. They were reacted for 30 minutes at a monomer pressure of 0.2 Torr and a power input of 50 watts across the electrodes, so that a polymer film was formed on the substrate to prepare a gas separating member according to this invention.

The gas permeability and separation factor of the gas separating member were measured by the ASTM method. The results were as follows:

Separation factor ($O_2/N_2$): 2.3
Rate of oxygen permeation: $3.7 \times 10^{-5}$ cm$^3$/sec.c-m$^2$·cmHg
Rate of nitrogen permeation: $1.6 \times 10^{-5}$ cm$^3$/sec.c-m$^2$·cmHg
Amount of oxygen and nitrogen permeated: 0.93 liter/min.·m$^2$·atm. pres.-air A device for producing the air enriched with oxygen the sectional view of which was shown in FIG. 7 was made by using the gas separating member obtained in this Example. This device comprises a pressure vessel 7 in the form of a pipe of 20 mm in diameter and 200 mm in length and a gas separating body 8 placed inside the pressure vessel 7. The gas separating body 8 was made by inserting one end portion of the bundle of about 500 hollow fibers of the gas separating members 81 of 200 mm in length into an outlet pipe 84 of 16 mm in diameter and 30 mm in length and pouring thereinto epoxy resin to be hardened in the sealed condition.

Figure 7:
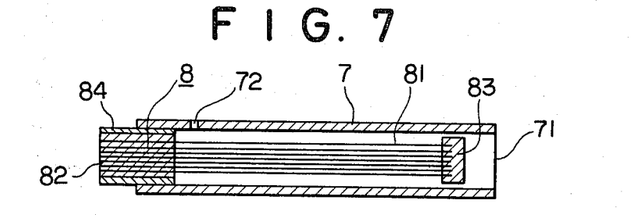
FIG. 7 is a sectional view of a device for producing the air enriched with oxygen which employs the gas separating member in the form of a hollow fiber according to the present invention.

In this step, the end portion of the bundle of the hollow fibers of the gas separating members 81 was kept projecting a little out of the opening of the outlet pipe 84. After the epoxy resin was hardened, the outlet pipe 84 together with the projecting end portion of the bundle was cut into round slices near the opening of the outlet pipe 84, so that the end portion 82 of the hollow fibers of the gas separating members 81 come out on the resulting cut section. The other end portion 83 of the bundle of the hollow fibers of the gas separating member 81 was embedded in the small bulk of epoxy resin and hardened. Therefore the hollow fiber of the gas separating members 81 resulted to have the opening on only one end portion 82 thereof. The gas separating body 8 was placed inside the pressure vessel 7 as shown in FIG. 7 and the pressure vessel 7 and the outlet pipe 84 were sealed up.

Next, a mixed gas consisting of 9.4 volume % of carbon dioxide and 90.6 volume % of nitrogen and having a pressure of 3.5 kg/cm$^2$ was introduced into the pressure vessel 7 of the device for producing the air enriched with oxygen at the opening end 71. Then, part of the mixed gas was gradually discharged at the opening 72 provided on the side wall near the opposite opening end of the opening end 71 of the pressure vessel 7 while the gas pressure in the pressure vessel 7 was kept at 3.5 kg/cm$^2$. In this way, the gas enriched with 20 volume % of carbon dioxide was obtained from the outlet pipe 84 at the rate of 0.1 liter per minute at 1 atm. pres. (1 kg/cm$^2$).

EXAMPLE 21

The procedures of Example 20 were repeated, except that octamethylcyclotetrasiloxane was used as organic monomers, whereby a polymer film was formed on the substrate to prepare a gas separating member according to this invention. The performance of this gas separating member was as follows:

Separation factor ($O_2/N_2$): 2.0

Rate of oxygen permeation: $6.8 \times 10^{-5}$ cm$^3$/sec.·cm$^2$·cmHg

Rate of nitrogen permeation: $3.4 \times 10^{-5}$ cm$^3$/sec.cm$^2$·cmHg

Amount of oxygen and nitrogen permeated: 1.9 liters/min.m$^2$·atm. pres.-air

EXAMPLE 22

The procedures of Example 20 were repeated, except that the reaction was continued for 15 minutes instead of 30 minutes, whereby a polymer film was formed on the substrate to prepare a gas separating member according to this invention. The performance of this gas separating member was as follows:

Separation factor (O$_2$/N$_2$): 2.0

Rate of oxygen permeation: $8.6 \times 10^{-5}$ cm$^3$/sec.cm$^2$·cmHg

Rate of nitrogen permeation: $4.4 \times 10^{-5}$ cm$^3$/sec.·cm$^2$·cmHg

Amount of oxygen and nitrogen permeated: 2.4 liters/min.m$^2$·atm. pres.-air

EXAMPLE 23

A PP substrate shown in the table was placed in the sample position 'A' (FIG. 1), and hexamethyldisiloxane was used as organic monomers. They were reacted for 20 minutes at a monomer pressure of 0.2 Torr and a power input of 50 watts across the electrodes, so that the first polymer film was formed on the substrate. Next, cyclohexene was used instead of hexamethyldisiloxane as organic monomers and the reaction was continued for 20 minutes at a monomer pressure of 0.2 Torr and a power input of 50 watts across the electrodes. Thus, the second polymer film was formed on the surface of the first polymer film to prepare a gas separating member according to this invention.

The performance of this gas separating member was as follows:

Rate of hydrogen permeation: $4.1 \times 10^{-5}$ cm$^3$/sec.·cm$^2$·cmHg

Rate of helium permeation: $3.7 \times 10^{-5}$ cm$^3$/sec.·cm$^2$·cmHg

Rate of oxygen permeation: $2.9 \times 10^{-6}$ cm$^3$/sec.·cm$^2$·cmHg

Rate of nitrogen permeation: $8.4 \times 10^{-7}$ cm$^3$/sec.·cm$^2$·cmHg

Rate of methane permeation: $9.7 \times 10^{-7}$ cm$^3$/sec.·cm$^2$·cmHg

Separation factor (H$_2$/N$_2$): 49
Separation factor (He/N$_2$): 44
Separation factor (O$_2$/N$_2$): 3.5
Separation factor (CH$_4$/N$_2$): 1.2

EXAMPLE 24

A PC-2 substrate shown in the table were placed in the sample position 'C', and octamethylcyclotetrasiloxane was used as organic monomers. They were reacted for 30 minutes at a monomer pressure of 0.2 Torr and a power input of 50 watts across the electrodes, whereby the first polymer film was formed on the substrate. Next, cyclohexene was used instead of octamethylcyclotetrasiloxane as organic monomers and the reaction was continued for 5 minutes at a monomer pressure of 0.2 Torr and a power input of 50 watts across the electrodes, whereby the second polymer film was formed on the surface of the first polymer film to prepare a gas separating member according to this invention.

The performance of this gas separating member was as follows:

Rate of hydrogen permeation: $1.1 \times 10^{-4}$ cm$^3$/sec.·cm$^2$·cmHg

Rate of helium permeation: $9.4 \times 10^{-5}$ cm$^3$/sec.·cm$^3$·cmHg

Rate of oxygen permeation: $1.4 \times 10^{-5}$ cm$^3$/sec.·cm$^2$·cmHg

Rate of nitrogen permeation: $4.3 \times 10^{-6}$ cm$^3$/sec.·cm$^2$·cmHg

Rate of methyl permeation: $5.6 \times 10^{-6}$ cm$^3$/sec.·cm$^2$·cmHg

Separation factor (H$_2$/N$_2$): 27
Separation factor (He/N$_2$): 22
Separation factor (O$_2$/N$_2$): 3.2
Separation factor (CH$_4$/N$_2$): 1.3.

EXAMPLE 25

The procedures of Example 23 were repeated, except that the substrate was placed in the sample position 'C' instead of 'A' and that 1-hexene was used instead of cyclohexene as organic monomers of the second polymer film. Thus, two polymer films were formed on the substrate to prepare a gas separating member according to the present invention. The performance of this gas separating member was as follows:

Rate of hydrogen permeation: $1.2 \times 10^{-4}$ cm$^3$/sec.·cm$^2$·cmHg

Rate of helium permeation: $1.0 \times 10^{-4}$ cm$^3$/sec.cm$^2$·cmHg

Rate of oxygen permeation: $1.6 \times 10^{-5}$ cm$^3$/sec.cm$^2$·cmHg

Rate of nitrogen permeation: $3.9 \times 10^{-6}$ cm$^3$/sec.·cm$^2$·cmHg

Rate of methyl permeation: $4.7 \times 10^{-6}$ cm$^3$/sec.·cm$^2$·cmHg

Separation factor (H$_2$/N$_2$): 31
Separation factor (He/N$_2$): 26
Separation factor (O$_2$/N$_2$): 4.2
Separation factor (CH$_4$/N$_2$): 1.2

EXAMPLE 26

A PC-3 substrate was placed in the sample position 'D', and hexamethyldisiloxane was used as organic monomers. They were reated for 30 minutes at a monomer pressure of 0.2 Torr, and a power input of 50 watts across the electrodes, so that the first polymer film was formed on the substrate. Next, for the second polymer film, toluene was used as organic monomers and the reaction was continued for five minutes at a monomer pressure of 0.2 Torr and a power input of 50 watts across the electrodes. Thus, the second polymer film was formed on the surface of the first polymer film to prepare a gas separating member according to this invention.

The performance of this gas separating member was as follows:

Rate of hydrogen permeation: $1.0 \times 10^{-4}$ cm$^3$/sec.·cm$^2$·cmHg

Rate of helium permeation: $9.0 \times 10^{-5}$ cm$^3$/sec.·cm$^2$·cmHg

Rate of oxygen permeation: $1.1 \times 10^{-5}$ cm$^3$/sec.·cm$^2$·cmHg

Rate of nitrogen permeation: $3.9 \times 10^{-6}$ cm$^3$/sec.·cm$^2$·cmHg

Rate of methyl permeation: $5.7 \times 10^{-6}$ cm$^3$/sec.·cm$^2$·cmHg

Separation factor (H$_2$/N$_2$): 26

Separation factor (He/N$_2$): 23
Separation factor (O$_2$/N$_2$): 2.7
Separation factor (CH$_4$/N$_2$): 1.5

EXAMPLE 27

The procedure of Example 26 were repeated, except that the substrate was placed in the sample position 'C' instead of 'D' and that styrene was used instead of toluene as organic monomers of the second polymer film. Thus, two polymer films were formed on the substrate to prepare a gas separating member according to this invention. The performance of this gas separating member was as follows:

Rate of hydrogen permeation: $3.3 \times 10^{-5}$ cm$^3$/sec.·cm$^{-2}$·cmHg
Rate of helium permeation: $3.1 \times 10^{-5}$ cm$^3$/sec.·cm$^{-2}$·cmHg
Rate of oxygen permeation: $3.2 \times 10^{-6}$ cm$^3$/sec.·cm$^{-2}$·cmHg
Rate of nitrogen permeation: $1.5 \times 10^{-6}$ cm$^3$/sec.·cm$^{-2}$·cmHg
Rate of methyl permeation: $2.2 \times 10^{-6}$ cm$^3$/sec.·cm$^{-2}$·cmHg
Separation factor (H$_2$/N$_2$): 22
Separation factor (He/N$_2$): 20
Separation factor (O$_2$/N$_2$): 2.1
Separation factor (CH$_4$/N$_2$): 1.4

EXAMPLE 28

The procedures of Example 27 were repeated, except that the substrate was placed in the sample position 'D' instead of 'C'. Thus, two polymer films were formed on the substrate to prepare a gas separating member according to this invention. The performance of this gas separating member was as follows:

Rate of hydrogen permeation: $4.1 \times 10^{-5}$ cm$^3$/sec.·cm$^{-2}$·cmHg
Rate of helium permeation: $4.0 \times 10^{-5}$ cm$^3$/sec.·cm$^{-2}$·cmHg
Rate of oxygen permeation: $3.6 \times 10^{-6}$ cm$^3$/sec.·cm$^{-2}$·cmHg
Rate of nitrogen permeation: $9.4 \times 10^{-7}$ cm$^3$/sec.·cm$^{-2}$·cmHg
Rate of methyl permeation: $1.7 \times 10^{-6}$ cm$^3$/sec.·cm$^{-2}$·cmHg
Separation factor (H$_2$/N$_2$): 43
Separation factor (He/N$_2$): 43
Separation factor (O$_2$/N$_2$): 3.9
Separation factor (CH$_4$/N$_2$): 1.8

EXAMPLE 29

The procedures of Example 27 were repeated to form the first polymer film on the substrate. Then, divinylbenzene was used as organic monomers of the second polymer film and the reaction was continued for one minute at a monomer pressure of 0.2 Torr and a power input of 50 watts across the electrodes. Thus, two polymer films were formed on the substrate to prepare a gas separating member according to this invention. The performance of this gas separating member was as follows:

Rate of hydrogen permeation: $1.4 \times 10^{-4}$ cm$^3$/sec.·cm$^{-2}$·cmHg
Rate of helium permeation: $1.3 \times 10^{-4}$ cm$^3$/sec.·cm$^{-2}$·cmHg
Rate of oxygen permeation: $1.4 \times 10^{-5}$ cm$^3$/sec.·cm$^{-2}$·cmHg
Rate of nitrogen permeation: $4.2 \times 10^{-6}$ cm$^3$/sec.·cm$^{-2}$·cmHg
Rate of methyl permeation: $5.4 \times 10^{-6}$ cm$^3$/sec.·cm$^{-2}$·cmHg
Separation factor (H$_2$/N$_2$): 35
Separation factor (He/N$_2$): 32
Separation factor (O$_2$/N$_2$): 3.3
Separation factor (CH$_4$/N$_2$): 1.3

EXAMPLE 30

The procedure of Example 28 were repeated to form the first polymer film on the substrate. Next, 1,3-pentadiene was used as organic monomers of the second polymer film and the reaction was continued for 10 minutes at a monomer pressure of 0.2 Torr and a power input of 50 watts across the electrodes. Thus, the second polymer film was formed on the surface of the first polymer film to prepare a gas separating member according to this invention. The performance of this gas separating member was as follows:

Rate of hydrogen permeation: $1.7 \times 10^{-4}$ cm$^3$/sec.cm$^{-2}$·cmHg
Rate of helium permeation: $1.4 \times 10^{-4}$ cm$^3$/sec.·cm$^{-2}$·cmHg
Rate of oxygen permeation: $2.5 \times 10^{-5}$ cm$^3$/sec.·cm$^{-2}$·cmHg
Rate of nitrogen permeation: $6.0 \times 10^{-6}$ cm$^3$/sec.·cm$^{-2}$·cmHg
Rate of methyl permeation: $8.5 \times 10^{-6}$ cm$^3$/sec.·cm$^{-2}$·cmHg
Separation factor (H$_2$/N$_2$): 28
Separation factor (He/N$_2$): 23
Separation factor (O$_2$/N$_2$): 4.2
Separation factor (CH$_4$/N$_2$): 1.4

EXAMPLE 31

The procedure of Example 29 were repeated, except that dicyclopentadiene was used instead of divinylbenzene as organic monomers of the second polymer film. Thus, two polymer films were formed on the substrate to prepare a gas separating member according to this invention. The performance of this gas separating member was as follows:

Rate of hydrogen permeation: $1.2 \times 10^{-4}$ cm$^3$/sec.·cm$^{-2}$·cmHg
Rate of helium permeation: $1.1 \times 10^{-4}$ cm$^3$/sec.·cm$^{-2}$·cmHg
Rate of oxygen permeation: $1.1 \times 10^{-5}$ cm$^3$sec.·cm$^{-2}$·cmHg
Rate of nitrogen permeation: $4.6 \times 10^{-6}$ cm$^3$/sec.·cm$^{-2}$·cmHg
Rate of methyl permeation: $5.8 \times 10^{-6}$ cm$^3$/sec.·cm$^{-2}$·cmHg
Separation factor (H$_2$/N$_2$): 26
Separation factor (He/N$_2$): 24
Separation factor (O$_2$/N$_2$): 2.4
Separation factor (CH$_4$/N$_2$): 1.3

EXAMPLE 32

The procedures of Example 27 were repeated, except that the substrate was placed in the sample position 'A' instead of 'C', so that the first polymer film was formed on the substrate. Next, furan was used as organic monomers of the second polymer film and the reaction was continued for 20 minutes at a monomer pressure of 0.2 Torr and a power input of 50 watts across the electrodes. Thus, the second polymer film was formed on the surface of the first polymer film to prepare a gas separating member according to this invention. The performance of this gas separating member was as follows:

Rate of hydrogen permeation: $1.1 \times 10^{-4}$ cm$^3$/sec.·cm$^2$·cmHg

Rate of helium permeation: $9.5 \times 10^{-5}$ cm$^3$/sec.·cm$^2$·cmHg

Rate of oxygen permeation: $9.8 \times 10^{-6}$ cm$^3$/sec.·cm$^2$·cmHg

Rate of nitrogen permeation: $2.5 \times 10^{-6}$ cm$^3$/sec.·cm$^2$·cmHg

Rate of methyl permeation: $2.3 \times 10^{-6}$ cm$^3$/sec.·cm$^2$·cmHg

Separation factor (H$_2$/N$_2$): 44
Separation factor (He/N$_2$): 39
Separation factor (O$_2$/N$_2$): 3.9
Separation factor (CH$_4$/N$_2$): 0.9

EXAMPLE 33

The procedures of Example 32 were repeated, except that acrylic acid was used instead of furan as organic monomers of the second polymer film. Thus, two polymer films were formed on the substrate to prepare a gas separating member according to this invention. The performance of this gas separating member was as follows:

Rate of hydrogen permeation: $2.6 \times 10^{-4}$ cm$^3$/sec.·cm$^2$·cmHg

Rate of helium permeation: $1.7 \times 10^{-4}$ cm$^3$/sec.·cm$^2$·cmHg

Rate of oxygen permeation: $3.6 \times 10^{-5}$ cm$^3$/sec.·cm$^2$·cmHg

Rate of nitrogen permeation: $1.2 \times 10^{-5}$ cm$^3$/sec.·cm$^2$·cmHg

Rate of methyl permeation: $1.7 \times 10^{-5}$ cm$^3$/sec.·cm$^2$·cmHg

Separation factor (H$_2$/N$_2$): 22
Separation factor (He/N$_2$): 14
Separation factor (O$_2$/N$_2$): 3.0
Separation factor (CH$_4$/N$_2$): 1.4

EXAMPLE 34

The procedures of Example 31 were repeated, except that the substrate was placed in the sample position 'D' instead of 'C', and that benzonitrile was used as organic monomers of the second polymer film. Thus, two polymer films were formed on the substrate to prepare a gas separating member according to this invention. The performance of this gas separating member were as follows:

Rate of hydrogen permeation: $5.8 \times 10^{-5}$ cm$^3$/sec.·cm$^2$·cmHg

Rate of helium permeation: $6.9 \times 10^{-5}$ cm$^3$/sec.·cm$^2$·cmHg

Rate of oxygen permeation: $3.6 \times 10^{-6}$ cm$^3$/sec.·cm$^2$·cmHg

Rate of nitrogen permeation: $1.5 \times 10^{-6}$ cm$^3$/sec.·cm$^2$·cmHg

Rate of methyl permeation: $1.9 \times 10^{-6}$ cm$^3$/sec.·cm$^2$·cmHg

Separation factor (H$_2$/N$_2$): 38
Separation factor (He/N$_2$): 45
Separation factor (O$_2$/N$_2$): 2.3
Separation factor (CH$_4$/N$_2$): 1.3

EXAMPLE 35

The procedures of Example 28 were repeated, except that the substrate was placed in the sample position 'A' instead of 'D' and that acetylenecarboxylic acid was used as organic monomers of the second polymer film, whereby two polymer films were formed on the substrate to prepare a gas separating member according to this invention. The performance of this gas separating member was as follows:

Rate of hydrogen permeation: $7.3 \times 10^{-5}$ cm$^3$/sec.·cm$^2$·cmHg

Rate of helium permeation: $7.4 \times 10^{-5}$ cm$^3$/sec.·cm$^2$·cmHg

Rate of oxygen permeation: $6.2 \times 10^{-6}$ cm$^3$/sec.·cm$^2$·cmHg

Rate of nitrogen permeation: $4.2 \times 10^{-6}$ cm$^3$/sec.·cm$^2$·cmHg

Rate of methyl permeation: $4.6 \times 10^{-6}$ cm$^3$/sec.·cm$^2$·cmHg

Separation factor (H$_2$/N$_2$): 17
Separation factor (He/N$_2$): 18
Separation factor (O$_2$/N$_2$): 1.5
Separation factor (CH$_4$/N$_2$): 1.1

EXAMPLE 36

The procedures of Example 35 were repeated, except that the substrate was placed in the sample position 'C' instead of 'A' and that acetylene dicarboxylicacid dimethylester was used instead of acetylenecarboxylic acid as organic monomers of the second polymer film. Thus, two polymer films were formed on the substrate to prepare a gas separating member according to this invention. The performance of this gas separating member was as follows:

Rate of hydrogen permeation: $1.6 \times 10^{-4}$ cm$^3$/sec.·cm$^2$·cmHg

Rate of helium permeation: $1.6 \times 10^{-4}$ cm$^3$/sec.·cm$^2$·cmHg

Rate of oxygen permeation: $1.4 \times 10^{-5}$ cm$^3$/sec.·cm$^2$·cmHg

Rate of nitrogen permeation: $7.1 \times 10^{-6}$ cm$^3$/sec.·cm$^2$·cmHg

Rate of methane permeation: $8.0 \times 10^{-6}$ cm$^3$/sec.·cm$^2$·cmHg

Separation factor (H$_2$/N$_2$): 22
Separation factor (He/N$_2$): 22
Separation factor (O$_2$/N$_2$): 2.0
Separation factor (CH$_4$/N$_2$): 1.1

What is claimed is:

1. A method of making a gas separating member which comprises the steps of setting a porous substrate in the form of a film, wall or hollow fiber in a plasma generator, activating an organosilane monomer by plasma to form a plasma polymerized film of said organosilane as a first layer having high gas permeability on a surface of the substrate, and activating a second monomer other than the organosilane by plasma to form a plasma polymerized layer as the second layer having high gas separation factor on the organosilane first layer.

2. The method according to claim 1, wherein the organosilane is a member selected from the group consisting of hexamethyldisiloxane, diethoxymethylsilane, octamethylcyclotertrasiloxane, tetraexthoxysilane, triethoxyvinylsilane and tetramethylsilane.

3. The method according to claim 1, wherein the second monomer other than the organosilane are hydrocarbons.

4. The method according to claim 3, wherein the hydrocarbon is a member selected from the group consisting of 1-hexane, cyclohexene, toluene, styrene, divinylbenzene, 1,3-pentadiene, dicyclopentadiene, furan, acrylic acid, benzonitrile, acetylenecarboxylic acid and acetylene dicarboxylic acid dimethylester.

5. The method according to claim 1, wherein the substrate is a porous glass hollow fiber.

6. A gas separating member comprising a porous substrate in the form of a film, wall or hollow fiber and a plasma polymerizate polymer film on a surface of the substrate, the polymer film including two layers formed by plasma polymerization, the two layers being a first layer having high gas permeability formed from an organosilane formed on a surface of the substrate by plasma polymerization and the second layer having high gas separation factor formed of a monomer other than an organosilane formed on the first layer by plasma polymerization.

7. The gas separating member according to claim 6, wherein the organosilane is a member selected from the group consisting of hexamethyldisiloxane, diethoxydimethylsilane, octamethylcyclotertrasiloxane, tetraethoxysilane, triethoxyvinylsilane and tetramethylsilane.

8. The gas separating member according to claim 7, wherein the substrate is a porous polymer hollow fiber which has a diameter of several thousands of angstroms to several millimeters.

9. The gas separating member according to claim 3, wherein the porous polymer hollow fiber is a member selected from the group consisting of a porous polypropylene hollow fiber and a porous cellulose acetate hollow fiber.

10. The gas separating member according to claim 6, wherein the monomer other than the organosilane is a hydrocarbon.

11. The gas separating member according to claim 10, wherein the hydrocarbon is a member selected from the group consisting of 1-hexane, cyclohexane, toluene, styrene, divinylbenzene, 1,3-pentadiene, dicyclopentadiene, furan, acrylic acid, benzonitrile, acetylenecarboxylic acid and acetylene dicarboxylic acid dimetylester.

12. The gas separating member according to claim 6, wherein the substrate is a porous glass hollow fiber.

13. The gas separating member according to claim 6, wherein the substrate has pores having a diameter of several tens of angstroms to several micrometers.

14. The gas separating member according to claim 13, wherein the substrate has circular pores having a diameter which is not more than several thousands of angstroms.

15. The gas separating member according to claim 13, wherein the substrate has rectangular or oval pores having a minor side or axis which is not more than 1,000 angstroms.

16. The gas separating member according to claim 13, wherein the substrate is a sintered product of metal, ceramic or polymer particles.

17. The gas separating member according to claim 13, wherein the substrate is a fibrous product formed by knitting, weaving or stacking fibers in felt forms.

18. The gas separating member according to claim 13, wherein the substrate is a porous polymer film.

19. The gas separating member according to claim 18, wherein the porous polymer film is a member selected from the group consisting of a porous cellulose acetate film, a porous polycarbonate film and a porous polypropylene film.

* * * * *